United States Patent
Stewart

[15] 3,693,595
[45] Sept. 26, 1972

[54] HOLDER FOR TEMPORARILY RESTRAINING AND SUSPENDING A LIVE ANIMAL

[72] Inventor: Stanly J. Stewart, R. R. 2, Carlinville, Ill. 62626

[22] Filed: May 12, 1971

[21] Appl. No.: 142,507

[52] U.S. Cl. .....................119/98, 119/103, 119/97
[51] Int. Cl. ......A62b 35/00, A01k 29/00, A61d 3/00
[58] Field of Search ..........119/96, 98, 103, 97; 17/1, 17/11, 44

[56] References Cited

UNITED STATES PATENTS

| | | | |
|---|---|---|---|
| 2,606,526 | 8/1952 | Lound | 119/97 R |
| 3,483,846 | 12/1969 | Quint | 119/98 |
| 3,530,834 | 9/1970 | Hollenback | 119/97 R |

*Primary Examiner*—Aldrich F. Medbery
*Attorney*—Davis, Lucas, Brewer & Brugman

[57] ABSTRACT

Holder is used for temporarily restraining and suspending a live animal, such as a pig, by the hind legs during a castration, vaccination, or other treatment procedure. A base having a pair of adjustably spaced vertical webs enables it to be secured to any convenient upright support, such as a rail on a fence or gate, or the side of a farrowing crate or pen. Opposite pairs of elongated jaw members extend forwardly from the base to grip the animal's hind legs when suspended in a head-down position. Each pair of jaw members has a plurality of separate, leg-embracing pockets spaced at different distances from the base. Smaller animals are suspended from rearward pockets nearer the base, and larger animals are suspended from forward pockets farther from the base. To accommodate the larger legs of larger animals, the pockets increase in size from rearward to forward positions. The spacing between pairs of jaw members is adjustable for animals of different sizes.

12 Claims, 6 Drawing Figures

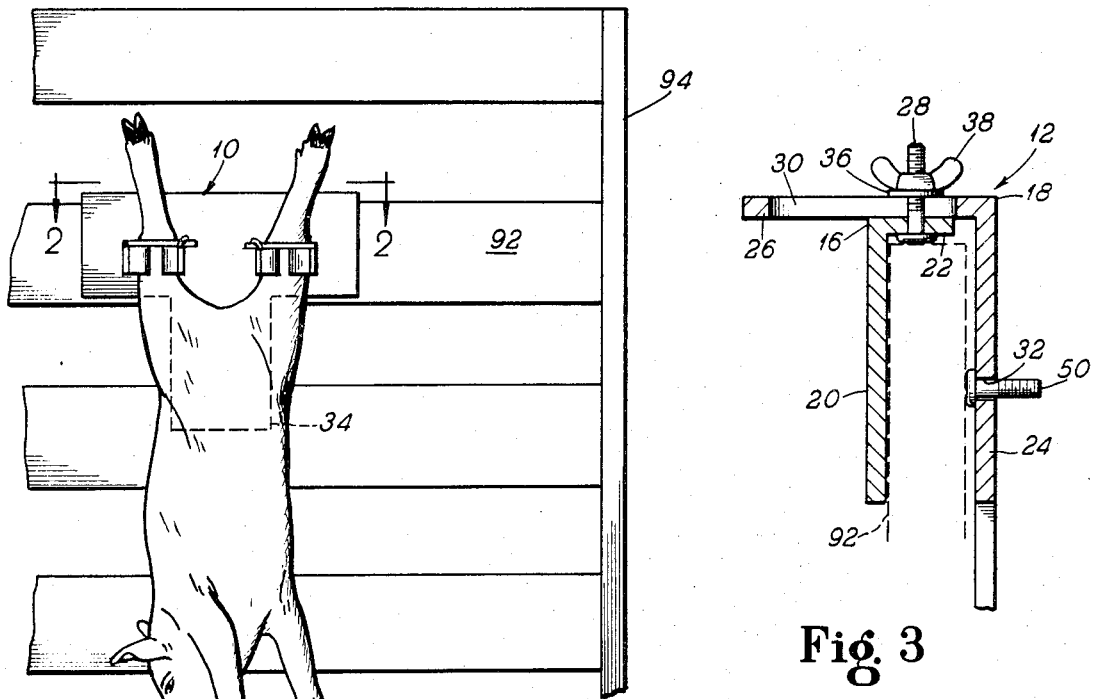
Fig. 1
Fig. 3
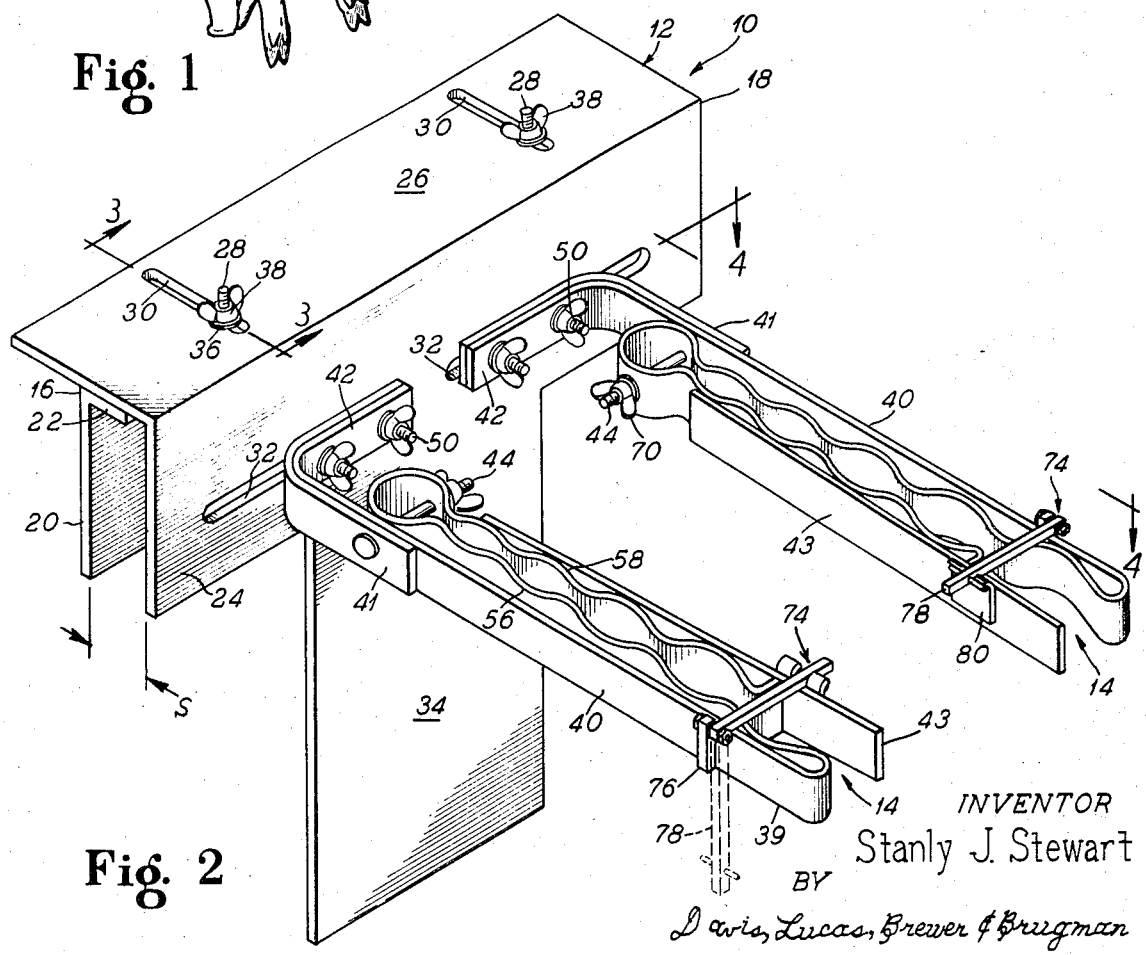
Fig. 2
INVENTOR
Stanly J. Stewart
BY
Davis, Lucas, Brewer & Brugman
ATTORNEYS INVENTOR
Stanly J. Stewart
BY
Davis, Lucas, Brewer & Brugman
ATTORNEYS

HOLDER FOR TEMPORARILY RESTRAINING AND SUSPENDING A LIVE ANIMAL

BACKGROUND OF THE INVENTION

This invention is a holder, for live animals, such as pigs.

In raising pigs, it is necessary from time to time to catch and restrain them long enough to perform certain treatment procedures, including castrations and periodic vaccinations, and the like.

Although most of these procedures are carried out when the pigs are quite young, they are nevertheless very active and one man is often required just to hold the pig.

There has long been a need for a pig holder which would allow one man to carry out these procedures alone. Previous attempts to develop pig holders have been unsuccessful for a variety of reasons. Previous holders have not held reliably, allowing the pig to fall and be injured, or they have held too tightly and injured the animal. Typically, attempts have been made to employ pig holders which have held the legs in a vise-like grip. These prior devices have been clumsy, difficult to use, expensive, and complicated.

To the applicant's knowledge, and before development of the present invention, there has not been one commercially successful pig holder on the market, which would hold the pig gently yet completely reliably, and with no more pressure on the pig's legs than would be exerted by a person's hands — all in spite of the obvious convenience and economy of enabling one man alone to carry out these procedures.

SUMMARY OF THE INVENTION

A general object of this invention is to provide a simple, inexpensive, quickly engageable and releasable device for holding small animals, such as pigs, without injury, and which may be used effectively and reliably by one man working by himself to carry out treatment procedures on the animals.

A specific object is to provide such a holder which is highly portable and which can be set up ready for use simply by hanging it on a gate, fence, pen, or farrowing crate.

An important feature in the holder is to provide opposite pairs of elongated jaw members for the animal's hind legs having a series of separate cavities or pockets for engaging the hind legs just behind the knees, at different distances forwardly from the base. Smaller animals are held in the pockets nearer the base, and larger animals are held in pockets farther from the base.

Another object is to provide in such a holder, separate leg-embracing pockets or cavities which vary in size to accommodate small and large animals alike in a single holder.

BRIEF DESCRIPTION OF THE DRAWINGS

Other objects and advantages will be apparent from the following description taken in connection with the drawings in which:

FIG. 1 is a view of a device illustrating a preferred form of the invention, showing it in use to hold a pig for a castration operation;

FIG. 2 is an enlarged perspective view of the device shown in FIG. 1;

FIG. 3 is a fragmentary sectional view of FIG. 2 taken along the line 3—3;

Like parts are referred to by like reference numerals throughout the figures of the drawings.

DETAILED DESCRIPTION OF THE DRAWINGS

Figure 4:
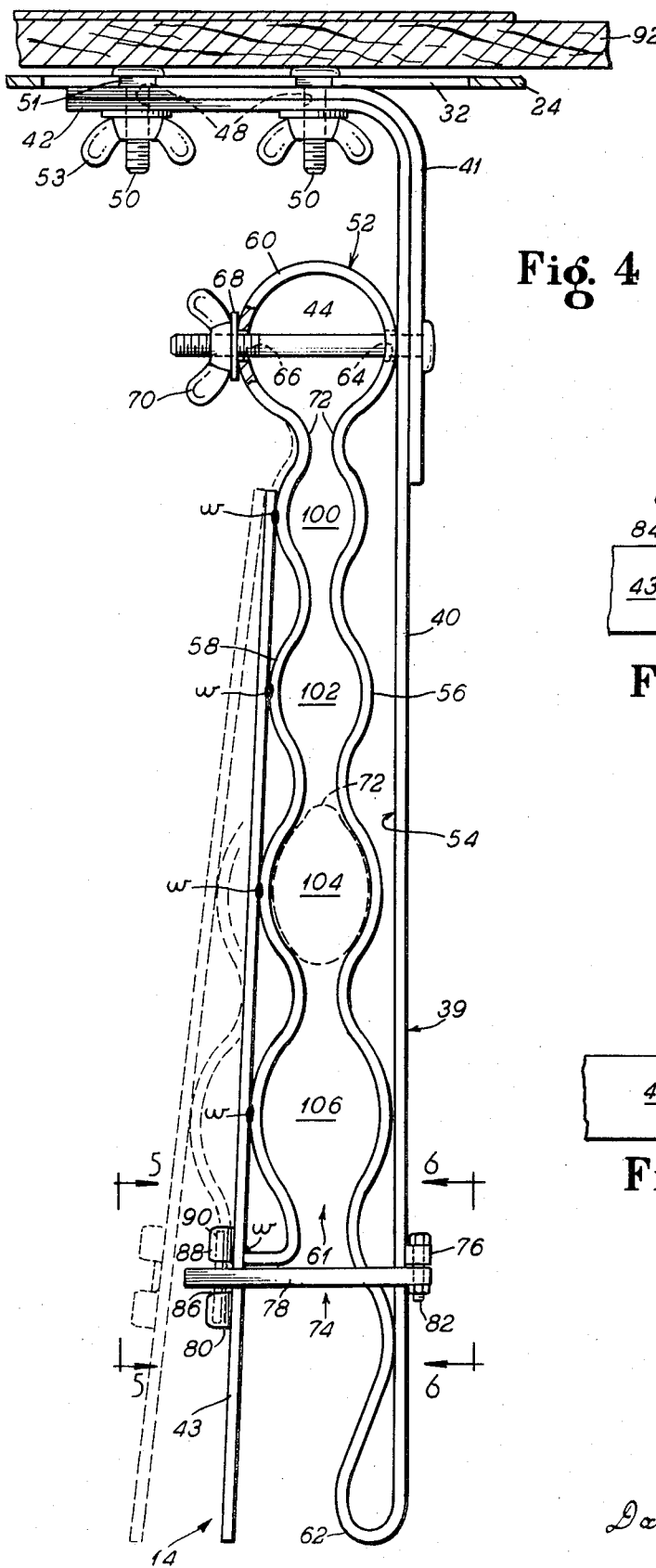
FIG. 4 is a fragmentary sectional view of FIG. 2 taken along the line 4—4.

Although the invention is disclosed as a holder for pigs, it should be understood that the principles of the invention may be applied readily to a wide variety of other animals which must be restrained for operative or treatment procedures, such as castration operations, vaccinations, and the like.

The device is generally designated 10 and comprises, broadly, a base 12 having opposite pairs of elongated jaw members extending forwardly from the base. Each pair of jaw members is generally designated 14. Inasmuch as they are identical, only one pair of jaw members 14 will be described in detail.

The base 12 comprises a back base member 16 and a front base member 18. The back base member has a vertical web 20 and a horizontal web 22. The front base member has a vertical web 24 and a horizontal web 26.

The back base member 16 has a pair of bolts 28 fixed to and upstanding from its horizontal web 22 for an adjustment to be described.

The front base member 18 has two parallel fore-and-aft extending slots 30 in the horizontal web 26, and a pair of aligned, transversely extending slots 32 in the vertical web 24, for adjustments which will be described.

The vertical web 24 of the front base member 18 is substantially T-shaped, having a lower, central, skirt-like extension 34. This extension bears on the front surface of the support when the device is hung on a rail, and stabilizes it in use.

The base members 16, 22, are assembled with the horizontal web 26 of the front base member slidably mounted atop the horizontal web 22 of the back base member. Bolts 28 extend through slots 30. Washers 36 and wing nuts 38 hold the two base members in selected relative positions to provide the proper spacing S between the vertical webs 20 and 24. By loosening the wing nuts 38 and sliding the web 26 on the web 22, the spacing S is readily adjustable, so the base 12 can be made to fit support rails or boards of various thicknesses.

As stated, each pair of jaw members 14, 14, are here shown as identical. Therefore, the component parts of only one pair will now be described.

Each jaw assembly 14 comprises a single strip 39, formed in three fore-and-aft passes, and selectively reinforced by an outer corner member 41 and an inner handle member 43. The material I have used successfully in pig holders, for small pigs from one week to four weeks old, is a common, workable grade of steel or iron capable of being formed as shown, and being approximately one-eighth inch thick and 1 inch wide. Alternatively, the strip 39 and the members 41 and 43 may be formed of a suitable plastic material, such as fiberglass-reinforced ABS (acrylonitrile butadiene styrene).

Each strip 39 is formed with an outer, substantially straight, strut portion 40. This has an inwardly extending transverse flange portion 42. The corner member 41 is formed to fit the flange 42 and the rear portion of the strut 40, and will be spot-welded or otherwise suitably adhered to it, to effectively reinforce the inner portion of the leg-gripping jaw assembly 14.

Each strut portion 40 has suitably affixed thereto a bolt 44. Each flange portion 42, and reinforcing corner member 41, has a pair of bolt holes 48, 48, and is held in a transversely adjusted position against the front surface of vertical web 24 by a pair of bolts 50, 50, which extend through one of the slots 32 and through the holes 48. The transverse slots 32 enable adjustment of the transverse spacing between the pairs of jaw members 14, 14, to accommodate pigs of different sizes.

Each strip 39 is formed to include a generally U-shaped corrugated member 52 extending along the inner side 54 of the reinforcing strut portion 40. The U-shaped corrugated member 52 comprises the following integral components for gripping a pig's hind legs: A corrugated outer jaw 56; a corrugated inner jaw 58; a relatively large radius, arcuate bight 60 connecting the two jaws and enabling the latter to flex toward and away from one another; and a forwardly open end portion 61 through which a pig's leg may be placed between the jaw members 56 and 58. The outer jaw 56 is joined to the forward end of the strut portion 40 by a forward, connecting bight portion 62.

The rear bight 60 has two holes 64, 66, through which the bolt 44 extends. The bight 60 is retained on the reinforced rear portion of strut 40 by a washer 68 and a wing nut 70 threadedly engaged with the bolt 44.

The bight 60, as described, is made of springy or resilient material. The compression of the bight by the wing nut 70 determines the extent to which the jaws 56, 58, open when the forward latch (to be described) is released. The open position is shown in broken lines in FIG. 4, and the extent of the opening 61 can be varied by adjustment of the wing nut 70.

The bight 60 is preferably made, as shown, with a relatively large radius. This enables it to be adjusted, within limits, to vary the spacing between the jaws 56, 58, when they are opened, and facilitate use of the holder on animals of different sizes.

The handle member 43 comprises a relatively straight strip which is fastened to the corrugated inner jaw 58 as by spot-welding at the high points indicated $w$ in FIG. 4.

It should be appreciated that, although I have found it convenient and economical to form the strut portion 40 and the U-shaped member 52 from a single steel strip 39, these individual portions may be formed separately, of the same or different materials, and of the same or different cross-sections.

An extremely important feature of the invention is that the corrugated jaws 56 and 58 define between them a series of separate, discrete, leg-embracing, pockets or cavities 100, 102, 104 and 106, spaced at different distances outwardly from the base 12. This accommodates pigs of different sizes. The smaller pigs will be suspended within the rear pockets 100 or 102, and larger pigs will be suspended in the forward pockets 104 and 106. By way of example, as shown in broken lines in FIG. 4, the leg 72 of a 21-day pig weighing possibly 15 pounds, will be held within pocket 104. This places the pig out far enough from the base 12 to allow for the size of its body and permit it to hang straight down in a natural position.

It will also be observed that the pockets increase in size from 100 to 106. This allows for the larger legs of pigs held by the forward pockets 104 and 106, and the smaller legs held by the inner pockets 100 and 102.

Once a pig's hind leg is inserted between the jaws 56 and 58, at whichever one of the pockets 100–106 is appropriate for the size of the pig, the jaws may be held closed at their forward end by a latch 74. Each latch 74 comprises a mounting bar 76 (FIG. 6), a latch bar 78, and a catch 80.

Figure 5:
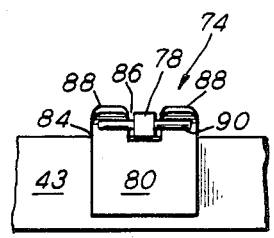
FIGS. 5 and 6 are fragmentary views of FIG. 4 taken, respectively, along the lines 5—5 and 6—6.
Figure 6:
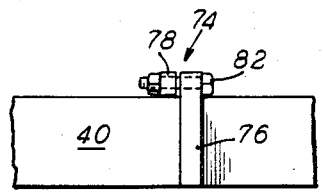

The mounting bar 76 is fastened as by welding to the outer side of the strut 40 and has an upper portion extending above the top edge thereof (FIG. 6). The latch bar 78 is pivoted, by pivot bolt 82, to the top portion of mounting bar 76. The catch 80 is a plate affixed as by welding to the inner side of the handle 43 and has a pair of upstanding, spaced ears 84, with an opening 86 therebetween. Each ear 84 has a small, inwardly extending, horizontal flange 88 adapted to hold a transverse latch pin 90 when the latch bar 78 is in the closed position shown in FIGS. 4 and 5.

To open the jaws 56, 58, the operator simply squeezes the forward ends of the handle 43 and the strut 40 together sufficiently to release the pin 90 from beneath the flanges 88, 88. The latch bar 78 is then swung upward about the pivot bolt 82, thereby allowing access to the jaw opening 61 for placing a pig's leg therein or removing it therefrom.

Use and operation of the device will now be described, as it is employed in the castration operation for pigs. The recommended age for this operation is from 1 to 4 weeks, so the pigs are quite small, though very active, at this time.

By loosening the wing nuts 38, the base members 16 and 18 may be moved relative to one another in a fore-and-aft direction to adjust the spacing S between their vertical webs 20 and 24. This adapts the holder to fit snugly over a rail 92 of a farrowing crate or fence 94, as shown in FIG. 1. The spacing between opposite pairs of jaws 14 is adjusted to fit the size of the pig by loosening nuts on bolts 50, and sliding the flanges 42 toward or away from one another, followed by retightening the nuts at the preferred spacing. Each bolt 50 has a square 51 beneath its head to prevent it from turning in the slot 32. The skirt-like lower extension 34 which depends from the base, bears against the front surface of the rail 92, stabilizing the holder 10 against undue twisting by the weight and movement of the pig.

With the latch 74 open, that is, with the latch bar 78 swung outward and downward as shown in broken lines in FIG. 2, the inner jaw 58 and handle 43 will spring inward to a position such as that shown in broken lines in FIG. 4, opening the forward entrance 61. The pig is grasped by the hind legs and each leg is carefully placed in one of the pockets 100, 102, 104 or 106, depending on the size of the pig, between the corrugated jaws 56 and 58. The forward ends of the jaws 56, 58, will then be drawn together and closed by bringing the latch bars 78 to the closed position as shown in FIGS. 2 and 4. In this closed position, the pig's leg will be snugly embraced within the appropriate pocket or cavity between the jaws, as indicated by the leg 72 in FIG. 4.

It will be observed that the jaws 56 and 58 are held in the latched position a fixed distance apart, so that there is no undue pressure or squeezing on the pig's leg. The pig is held by a gentle, embracing support somewhat similar to that of a person's hand, encircling the leg just above the knee. Thus, and this is another point of the invention, the leg will be supported without injury, even in the absence of padding or rubber-like covers, which are unsanitary and difficult or impossible to clean by usual boiling or steam-cleaning techniques.

With the forward ends of the jaw members 52 drawn together and closed by the latch bars, as described above, the pig will be firmly and effectively, but gently, held with its hind legs spaced apart a predetermined distance, and with its back or its belly forward, as desired during the operation procedure.

Sanitation is an important factor in minimizing losses of pigs following the castration procedure. Losses due to fatalities following this procedure can run from one to seven pigs per hundred, and this is often in direct relation to the cleanliness of the equipment and surroundings. For this reason, it is a very important part of the present invention that, where desired, the holder can be made entirely of metal, and sanitized before each use by immersing it in boiling water.

The portions of the corrugated jaw members 56, 58, which engage the pig's legs should be smooth, without any sharp projections or rough edges. The edges will preferably be ground or filed smooth. The leg-engaging portions of the jaws 56 and 58 may, further, be provided with rubber-like or plastic surfaces which improve the frictional contact, and at the same time provide a certain desirable resilience, causing the holder jaws to lend themselves flexibly to the contour of the animal's leg. Special car must be used in sanitizing such holders, either with cold bactericidal solutions, or by making sure in advance that the rubber or padding materials and their adhesives will withstand prolonged exposures to boiling water or steam.

An important advantage of the device is its ready portability. It can be moved from place to place, wherever the animals are located, and hung on various rail-like supports or projections which are readily found on fences, pens, crates and buildings.

Having thus described my invention, what I claim as new and desire to secure by Letters Patent, is:

1. A holder for temporarily restraining and suspending a live animal such as a pig, by the hind legs, during a treatment procedure, comprising:
   a base adapted to be fastened to a vertical support;
   opposite pairs of elongated jaw members extending forwardly from said base, each said pair of jaw members having a rearward hinge portion and a forward opening to enable placement of the leg of an animal between said jaw members;
   latch means at said forward end of each said pair of jaw members movable between latched and unlatched conditions, said latch means in the latched condition holding said jaw members closed with the proximate inner surfaces of said jaw members in substantially fixed spaced relation, said latch means in the unlatched condition enabling said forward opening to be widened for the placement of the leg of an animal between said jaw members;
   each said pair of jaw members having a plurality of discrete, leg-embraceable pockets disposed from back to front along said proximate inner surfaces at different distances from said base, said pockets being selectively accessible through said forward opening when said latch means is in unlatched condition, thereby enabling animals of different sizes to be suspended from different ones of said pockets.

2. A holder for temporarily restraining and suspending a live animal according to claim 1 in which said pockets are defined by matching concave portions of said proximate inner surfaces of said jaw members.

3. A holder for temporarily restraining and suspending a live animal according to claim 1 in which said pockets increase in size from rearward to forward positions to accommodate animals having correspondingly increasing leg sizes.

4. A holder for temporarily restraining and suspending a live animal according to claim 1 in which said opposite pairs of elongated jaw members are movably mounted on said base to adjust the spacing therebetween to accommodate animals having different spacings between legs.

5. A holder for temporarily restraining and suspending a live animal according to claim 1 in which said proximate inner surfaces of said jaw members are corrugated and have substantially matching ridges and depressions defining said leg-embraceable pockets.

6. A holder for temporarily restraining and suspending a live animal according to claim 1 in which said opposite pairs of elongated jaw members are movably mounted on said base to adjust the spacing therebetween, and said pockets increase in size from rearward to forward positions, to accommodate animals having different spacings between legs and different sizes of legs.

7. A holder for temporarily restraining and suspending a live animal according to claim 1 in which each said pair of jaw members comprises an elongated strut extending forwardly from said base and a pair of parallel, contiguous corrugated jaw members open at their forward end supported along the inner side of said strut.

8. A holder for temporarily restraining and suspending a live animal according to claim 1 in which each said pair of jaw members comprises an elongated strut extending forwardly from said base and a generally U-shaped corrugated member of spring-like material supported along the inner side of said strut and having matching corrugations defining said leg-embraceable pockets, the rearward end portion of said U-shaped corrugated member comprising an arcuate bight providing flexibility enabling the forward end portion thereof to be opened during the placement of the leg of an animal within one of said pockets.

9. A holder for temporarily restraining and suspending a live animal according to claim 8 in which said U-shaped corrugated member is fastened to said strut by a bolt extending through apertures in said bight, and wing nut means on said bolt is effective to variably compress said bight to adjust the opening of said forward end portion of said U-shaped corrugated member.

10. A holder according to claim 1 in which said base includes a lower vertical extension adapted to abut a front surface of said vertical support to thereby stabilize said holder in use.

11. A holder for temporarily restraining and suspending a live animal such as a pig, by the hind legs, during a treatment procedure comprising:

front and back base members, each comprising an angle plate having vertical and horizontal webs, said vertical webs being in spaced parallel relation to grasp a support therebetween, said horizontal web of said front base member being slidably mounted relative to said horizontal web of said back base member to adjust the spacing between said vertical webs, bolt and elongated slot means interconnecting said horizontal webs to maintain a selected spacing between said vertical webs, said vertical web of said front base member having a lower extension for stabilizing said device on said support;

a pair of supporting struts extending forwardly from said front base member, each of said struts having a transverse flange abutting a front surface of said vertical web of said front base member;

each of said transverse flanges being connected to said vertical web of said front base member by bolt and elongated slot means to enable adjustment of the spacing between said struts, to accommodate animals of different sizes;

a generally U-shaped member, made of corrugated strip material defining a plurality of selective leg engaging pockets, having a pair of opposed limbs joined by an arcuate bight, disposed along the inner side of each strut with its forward end open to enable placement of a leg of an animal between said limbs, said arcuate bight and a forward end of one of said limbs fastened respectively to rear and forward portions of said strut; and releasable latch means carried by each strut and engageable with the other of said limbs for holding said U-shaped member closed on the legs of an animal.

12. A holder according to claim 11, wherein both limbs of each U-shaped member comprise a unitary extension of a corresponding strut.

* * * * *